United States Patent [19]

Benuzzi, deceased et al.

[11] Patent Number: 4,796,500
[45] Date of Patent: Jan. 10, 1989

[54] SHIFTING DEVICE

[76] Inventors: Gino Benuzzi, deceased, late of Bologna; by Lidia Benuzzi, Heiress-at-law, 5, Via Angelo Custode, Bologna, both of Italy

[21] Appl. No.: 847,375

[22] Filed: Apr. 2, 1986

[30] Foreign Application Priority Data

Apr. 3, 1985 [IT] Italy .............................. 15150/85[U]

[51] Int. Cl.[4] .......................... B23Q 5/22; B23Q 5/26
[52] U.S. Cl. .......................................... 83/277; 83/262; 83/268; 83/409; 83/458; 414/19; 414/668; 414/796
[58] Field of Search ................. 83/277, 271, 262, 269, 83/452, 458, 409; 269/25, 27, 32, 157; 414/18, 19, 113, 114, 749, 660, 668, 659

[56] References Cited

U.S. PATENT DOCUMENTS

| | | | |
|---|---|---|---|
| 1,822,501 | 9/1931 | Onsrud | 269/32 |
| 4,523,749 | 6/1985 | Kindgren | 83/409 |
| 4,589,317 | 5/1986 | Kawano | 83/409 |

Primary Examiner—Paul A. Bell
Assistant Examiner—Scott A. Smith
Attorney, Agent, or Firm—Pollock, Vande Sande & Priddy

[57] ABSTRACT

A device for shifting packs (P) of panels along the workpiece support table (L) of a sawing machine. The top surface of a stack of panels (P') comprises a pair of levers (1, 2) hingedly mounted on a motorized carriage (C). The first lower lever (1) frontally contacts the side of the pack (P) by its forward end defining a vertical pushing front (13) and has a lower jaw (17) acting on the underside of the edge of the pack (P), while a second, upper lever (2) forms, with its forward end (20, 21), the upper jaw acting on the top side of the edge of the pack (P). The second lever is actuated for gripping the edge of the pack between the two jaws (17, 20, 21). The lower jaw (17) can be moved from an operative position in which it projects forward with respect to the vertical pushing front of the first lever (1), whereby the shifting device is adapted to grip the edge of the pack (P), to an inoperative position in which it is retracted with respect to the vertical pushing front of the first lever (1), whereby the shifting device is adapted to act as a pusher which shifts the pack (P) of panels with a skimming action with respect to the underlying flat horizontal surface, without gripping the edge of the pack itself.

4 Claims, 2 Drawing Sheets

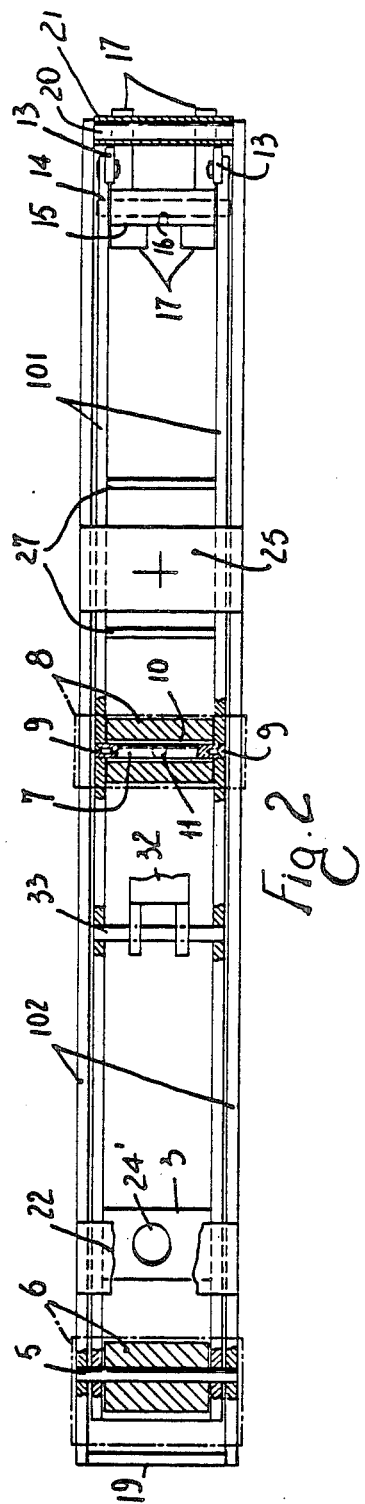
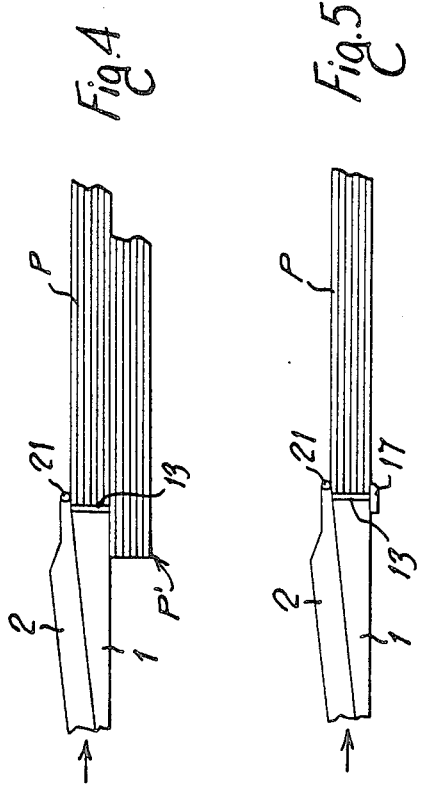
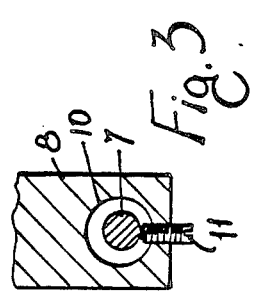

SHIFTING DEVICE

FIELD OF THE INVENTION

The invention relates to the machines for cutting panels or packs of panels of wood and/or of any other material and, more particularly, it refers to the devices on such machines which shift the packs of boards toward the cutting line, and which in certain instances must also withdraw, with a skimming action, the packs from the top of supply stack placed on a lifting table.

SUMMARY OF THE INVENTION

The object of the invention is a shifting device of this kind, which is of simple construction, can be easily adjusted for any different operational requirements, and has the property of adapting itself to any unevenness of the side of a pack which is shifted so as to prevent even the slightest disarrangement of this pack.

BRIEF DESCRIPTION OF THE DRAWINGS

The characteristic features of such a device and the advantages arising therefrom will appear from the following specification, in which reference is made to the attached drawings in which:

FIG. 2 is a partly sectioned plan view of the device.

FIG. 3 shows a detail of the device, in section along line III—III of FIG. 1.

FIGS. 4 and 5 are diagrammatical side views showing the device in two different operative conditions.

DESCRIPTION OF PREFERRED EMBODIMENT

Figure 1:
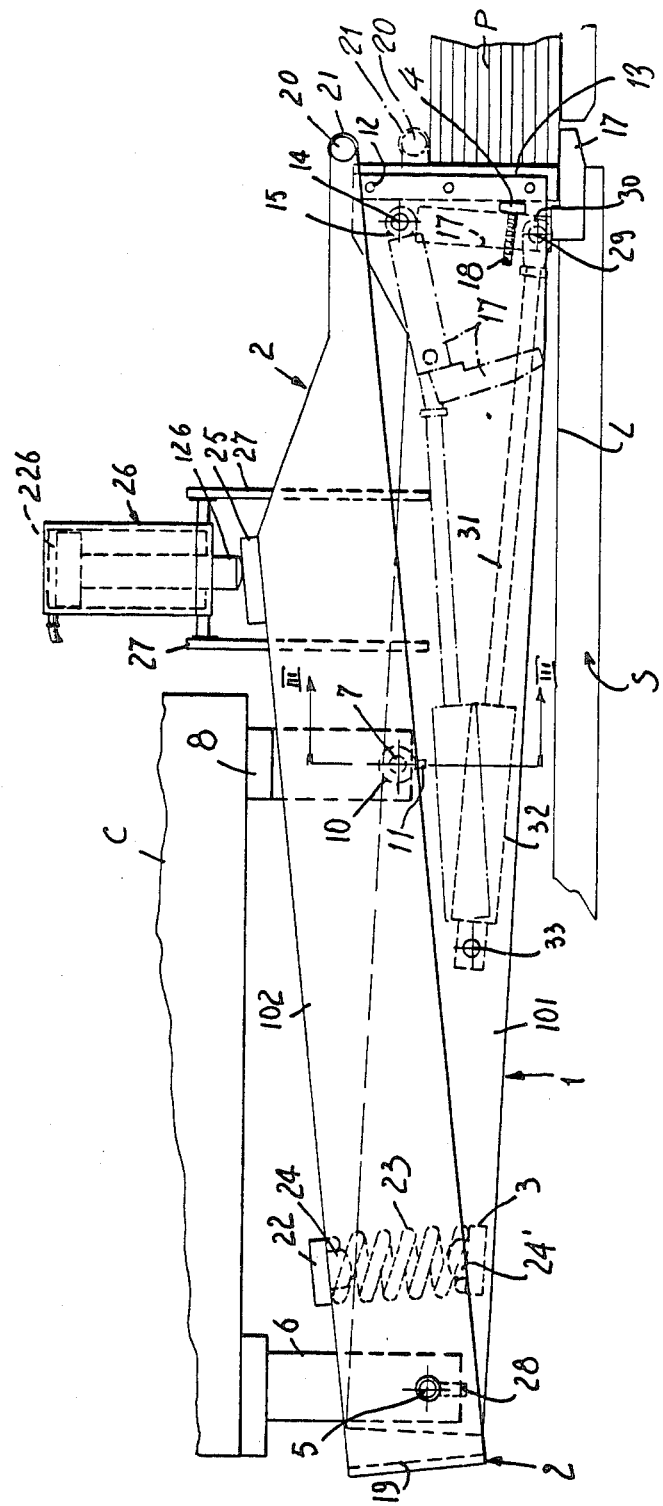
FIG. 1 is a side elevational view showing the device in rest condition.

With reference to FIG. 1, the device is substantially formed by two levers 1 and 2 having their longitudinal axis located in a vertical plane, pivotally interconnected at their rear ends, and arranged with their fore ends for clamping a pack P of panels. Of these levers, the lower lever 1 is supported by the motorized carriage C that moves the device parallelly to the workpiece support table L of the sawing machine, a plurality of said devices being mounted on the said carriage in the fashion of the teeth of a comb. More particularly, it is to be noted from FIG. 2 that the lever 1 is formed by two equal parallel plates 101, which are interconnected by means of a rear crosspiece 3 and by means of pivot pin 5, Reference numeral 5 denotes the pivot the rear end of plates 101 is pivotally connected to the support 6 integral with carriage C, and by means of pin 7, the intermediate section of the plates is connected to the support 8, which is also integral with carriage C. The pivot pin 5 is axially locked in support 6 by a dowel 28 screwed in this support, while the pin 7, as shown in FIGS. 2 and 3, is by its ends secured in said plates 101, for example, by means of screws 9, and is accommodated in a bore 10 made in support 8 and having a greater diameter that the pin 7, so that this pin is positioned with play in said bore. In the intermediate lower portion of support 8 a screw 11 is screwed, which partly projects into the interior of bore 10, and on which the pin 7 is brought to bear. At their fore ends, the plates 101 terminate in a vertical front edge, and on their inner sides they are provided with facings inside which are accommodated the platelets 13 partly projecting from the front edge of lever 1, said platelets 13 being secured by means of screws 12, and frontally contacting the side to be clamped of a pack P of boards. The platelets 13 are preferably of aluminum, and a perfectly perpendicular condition of their front edge with respect to the workpiece support table L is ensured by subjecting the platelets, once they have been fitted on lever 1, and after having effected the adjustment operations to be disclosed later, to a slight straightening operation by means of the same disk saw to which the device according to the invention feeds the packs P of panels. By this operation, which is simultaneously performed on all of the shifting devices associated with the carriage C, a perfect transversal alignment is obtained also of the pushing front side of the devices, which is thus located in an ideal vertical plane parallel to the ideal vertical plane along which the said disk saw is moved. During this machining operation for the straightening, the lever 1 is kept in the down position in which its pin 7 contacts the screw 11.

At the front section of lever 1, between the plates 101, a bushing 15 is transversely fitted by means of a pin 14, and is provided with a transverse dowel 16 for axially locking the said pin, which therefore does not need any further means for securing it to plates 101. At the ends of bushing 15 two equal parallel L-shaped levers 17 are fastened in such a manner as to form with the said bushing a substantially forked structure, and these levers are so configured that when their leg abuts against the crosspiece 4, their foot is placed under the lower ends of platelets 13, so that they suitably project from the front edge of these platelets. When the device is intended only for longitudinally shifting the packs of boards along the workpiece support table L, the legs of levers 17 are secured to the crosspiece 4 by means of screws 18. The workpiece support table L is longitudinally provided with grooves S in which the feet of levers 17 can freely slide. By acting upon the screw 11 shown in FIG. 3, it is possible to bring exactly the previously milled top side of the feet of levers 17 (FIG. 1) in a condition which is perfectly coplanar with table L. For this purpose, it is possible to suitably act also upon the screws 18. It is apparent that all these possibilities of adjustment, and also the above mentioned step of straightening out the front edge of platelets 13 by means of the disk saw of the sawing machine, considerably simplifies the entire operation for constructing the device according to the invention. The above mentioned operation of straightening out the front edge of platelets 13, previously disclosed, must obviously be performed when the levers 17 are not in their active working position.

The lever 2 of the device is formed by two equal parallel plates 102 arranged at the outer sides of lever 1, which are mutually joined by means of a crosspiece 19, and which by the rear end are pivotable about the pivot pin 5, and by the tapered fore end are connected to each other by means of a horizontal crosspiece 20 covered by a sheath 21 of a suitable elastic material.

The crosspiece 20-21 projects from the front edge of lever 1, and overlies the foot portion of levers 17. In counterposed relation with the crosspiece 3, the plates 102 integrally carry a similar crosspiece 22, and between the said crosspieces there is arranged a cylindrical helical spring 23 which is held in position by truing means diagrammatically designated by 24 and 24'. The spring 23 urges the levers 1 and 2 into their openmost position, as shown in FIG. 1. In this position, the lever 1 abuts against the top portion of support 8 which, in front view, has a substantially "T" shaped configuration.

On the top side of its section extending forward from carriage C, the lever 2 is provided with a crosspiece 25 on which there bears the stem 126 of a fluid pressure operated, single-acting cylinder and piston unit 26 which by its body is fastened to a pair of brackets 27 extending across the space between the plates forming the lever 2, and welded at their lower ends to the plates 101 of lever 1. When fluid under pressure is supplied into the chamber 226 of unit 26, the stem of this unit extends, and, by acting upon the crosspiece 25, it lowers the lever 1 against the action of spring 23. Under these conditions, the pack P of panels that frontally abuts against the platelets 13, is firmly clamped by the feet of levers 17 and by the crosspiece 20–21. Reverting to the detail of FIG. 3, and referring also to FIG. 1, it is appreciated that the gripper device when in closed condition, can freely swing about the pivot pin 5 by a movement which is proportional to the play between the pin 7 and the bore 10. This possibility allows the gripper device to adjust itself to any small unevenness of the clamped side of a pack P of boards.

With a small change, the shifting device according to the invention can be converted for operating, apart from the manner described and shown in FIG. 5, also in the manner shown in FIG. 4, in which it is seen that the device is temporarily without the projecting lower feet of levers 17, so that the device can be translated on a stack P' of boards placed on a lifting table, to remove with a skimming action a pack P of boards to be introduced into the sawing cycle. When the device is out of the stack P, it is automatically returned to the operative condition shown in FIG. 5, for firmly clamping a pack P. In order to render the device fit for these two modes of operation, the screws 18 that previously secured the levers 17 to the crosspiece 4 are replaced by other screws, which now merely function as adjustable abutments. A bushing 30 is transversely arranged between the legs of levers 17 and is pivotally connected thereto by means of a pivot pin 29, and is integral with the end of a link 31 connected to the stem of a small fluid pressure operated, double-acting cylinder and piston unit 32 which by its body is pivotally connected at 33 between the plates 101 forming the lever 1. By activating this unit 32, the levers 17 may either be kept in their active position shown in solid lines in FIG. 1, or neutralized, as shown in the same FIG. 1 by dash-and-dot lines.

What is claimed is:

1. A device for shifting packs (P) of panels along a flat horizontal surface, said device comprising first and second levers (1, 2) hingedly mounted on a motorized carriage (C), said first, lower lever (1) being adapted to frontally contact a side of a pack (P) to be shifted by its forward end defining a vertical pushing front (13), said first lever having a lower jaw element (17) arranged so as to act on an underside of an edge of said pack (P) of panels to be shifted, said second, upper lever (2) forming, with its forward end (20, 21), an upper jaw element acting on a top side of said edge of said pack (P) of panels to be shifted, means (26) being provided for actuation of said second lever for gripping said edge of said pack between said two jaw elements (17, 20, 21), said lower jaw element (17) being movable from an operative position in which it projects forwardly with respect to said vertical pushing front of said first lever (1), whereby said shifting device is adapted to grip said edge of said pack (P) of panels to be shifted, to an inoperative position in which it is retracted to the rear of said vertical pushing front of said first lever (1), whereby said shifting device is adapted to act as a pusher which shifts said pack (P) of panels with a skimming action with respect to the underlying flat horizontal surface, without gripping said edge of said pack itself.

2. A shifting device according to claim 1, wherein rear ends of said levers (1, 2) are hingedly connected to a common support (6) on said motorized carriage (C), said first lever (1) being connected to another support (8) on said carriage (C), with the interposition of an adjusting screw (11) and of guide means (7, 10) which enable positioning of said lower jaw element (17) with respect to said workpiece support table (L).

3. A shifting device according to claim 2, wherein said first and second levers (1, 2) are urged into their open position by spring means (23) arranged therebetween, and wherein said means (26) for actuation of said second lever (2) into its gripping position consist of a fluid-operated cylinder and piston unit carried by said first lever (1) and acting on said second lever (2).

4. A shifting device according to claim 1, wherein said lower jaw element (17) is formed by a foot portion of at least one L-shaped lever which is swingably mounted on said forward end of said first lever (1) in the region of said vertical pushing front (13) and can be moved from its operative position to its inoperative position by means of a piston and cylinder unit mounted on said first lever (1).

* * * * *